(12) United States Patent
Weber et al.

(10) Patent No.: US 6,950,882 B1
(45) Date of Patent: Sep. 27, 2005

(54) CONTROL FOR A PLURALITY OF ELECTRICAL CONSUMERS OF A MOTOR VEHICLE

(75) Inventors: Jens Weber, Kelkheim-Fischbach (DE); Jens Kircher, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,222

(22) PCT Filed: Jul. 22, 1999

(86) PCT No.: PCT/DE99/02221

§ 371 (c)(1),
(2), (4) Date: May 2, 2001

(87) PCT Pub. No.: WO00/05103

PCT Pub. Date: Feb. 3, 2000

(30) Foreign Application Priority Data

Jul. 22, 1998 (DE) ................................ 198 32 531

(51) Int. Cl.[7] ............................................. G06F 15/16
(52) U.S. Cl. ...................................................... 709/250
(58) Field of Search .......................... 709/250; 701/24, 701/29, 33, 36; 710/24, 29, 33, 36

(56) References Cited

U.S. PATENT DOCUMENTS

| 4,594,571 | A | * | 6/1986 | Neuhaus et al. ............ 307/10.1 |
| 4,630,043 | A | * | 12/1986 | Haubner et al. ......... 340/825.57 |
| 5,091,856 | A | * | 2/1992 | Hasegawa et al. ............. 701/36 |
| 5,303,348 | A | * | 4/1994 | Botzenhardt et al. ......... 710/114 |
| 5,555,502 | A | * | 9/1996 | Opel ............................... 701/36 |
| 5,732,074 | A | | 3/1998 | Spaur et al. |
| 5,752,008 | A | * | 5/1998 | Bowling ......................... 703/13 |
| 5,808,374 | A | * | 9/1998 | Miller et al. ................ 307/10.1 |
| 6,023,232 | A | * | 2/2000 | Eitzenberger ................ 340/988 |
| 6,025,655 | A | * | 2/2000 | Hopf .......................... 307/10.2 |
| 6,032,089 | A | * | 2/2000 | Buckley ......................... 701/36 |
| 6,188,939 | B1 | * | 2/2001 | Morgan et al. ................ 701/36 |
| 6,275,231 | B1 | * | 8/2001 | Obradovich ................. 345/970 |
| 6,314,422 | B1 | * | 11/2001 | Barker et al. .................. 707/10 |
| 6,331,762 | B1 | * | 12/2001 | Bertness ...................... 320/134 |

FOREIGN PATENT DOCUMENTS

| DE | 42 19 669 | | 12/1993 | |
| DE | 44 01 785 | | 7/1994 | |
| EP | 307344 | | 3/1989 | |
| EP | 392441 | | 10/1990 | |
| EP | 001427165 A2 | * | 10/1998 | ........... H04L 29/06 |

OTHER PUBLICATIONS

Information Sciences Institute, RFC: 791 Internet Protocol, Sep. 1981, pp. (i) to (3).*
Harry Newton, Newton's Telecom Dictionary, CMP Books, 19th edition. p. 712.*

* cited by examiner

Primary Examiner—Jeffrey Gaffin
Assistant Examiner—David Martinez
(74) Attorney, Agent, or Firm—Kenyon & Kenyon

(57) ABSTRACT

A controller for a plurality of electric loads of a motor vehicle has a simple design and flexible applicability and expandability. Each electric load is arranged together with a local computer in a load module and is controlled by the respective local computer within the load module and the local computers are connected to a central computer over a databus and exchange control data according to a standard protocol.

5 Claims, 2 Drawing Sheets

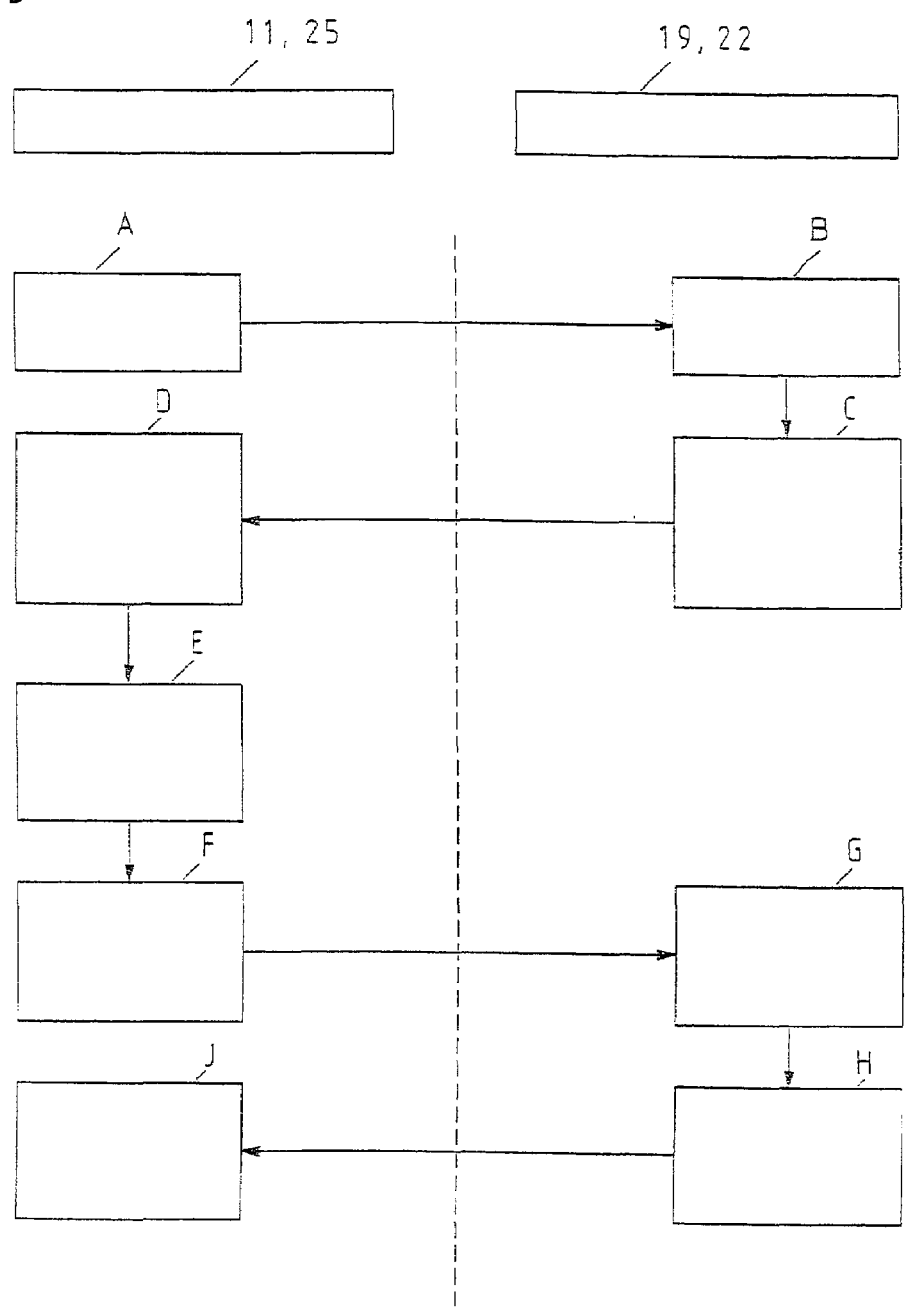

CONTROL FOR A PLURALITY OF ELECTRICAL CONSUMERS OF A MOTOR VEHICLE

FIELD OF THE INVENTION

The present invention relates to of automotive electronics or electrical systems. More particularly, the present invention relates to a controller for a plurality of electric loads in a motor vehicle.

BACKGROUND INFORMATION

Switching and/or controlling electric loads in a motor vehicle are conventionally performed with the use of simple switches (example: light on/off), pushbuttons (example: power windows or electrically adjustable side mirrors) or actuators (example: instrument lighting) in an electric circuit. The actuators are usually designed as analog devices. They are also designed specifically for a given process or load and they are arranged in a decentralized location. This also has the disadvantage that in the case of a plurality of electric loads, such as those in the case of modern vehicles, there must also be a plurality of power supply lines with plug connectors leading from the switches, pushbuttons and actuators to the individual loads.

In addition, there have also been attempts to use a computer to control some of the electric equipment of the motor vehicle. The computer is arranged centrally and is designed in part specifically for the control functions. It generates the control pulses for the electric component (the electric load). At the same time, the computer also performs certain "infotainment" functions, such as navigation, radio or telematics. One problem is optimizing the operating system to perform both infotainment as well as control functions. However, retrofitting and scalability of functions from the control area are problematical if hardware changes must be made in the PC.

German Published Patent Application No. 42 19 669 relates to a control unit for calculating control quantities for recurring control operations in a motor vehicle, including, in particular, engine management (ignition, injection) and the ABS brake system. The ignition module, the injection module and the brake module each include a microprocessor, a memory module and on/off circuits, and these modules continuously transmit the control quantities achieved over a connected databus to a central control unit. Any bus system suitable for data transmission in the motor vehicle may be used for this purpose.

European Published Patent Application No. 392,411 relates to an automotive controller having a central system manager module, which works together with load modules (air conditioner, power steering, transmission) over a bus. The system manager module, however, can be activated only when the user has identified himself correctly as the proper user. No special transmission protocol is provided.

German Published Patent Application No. 44 01 785 describes an integrated wiring system for a motor vehicle having a central control unit and a plurality of terminal control units that exchange data. This data exchange is not performed according to a standard protocol, but instead according to different communication protocols at different transmission rates.

European Published Patent Application No. 307,344 describes an automotive wiring system, in which user stations exchange data over a bus. Interface devices are connected to the user stations in a star network, with end devices (loads) connected in groups to the interface devices. There is no provision for combining them into load modules.

U.S. Pat. No. 5,732,074 describes a mobile portable wireless communication system, in which data transfer occurs between a remote computer and an automotive controller according to the Internet protocol. Data is converted in the motor vehicle and sent to a local control network, which operates according to another bus system (CAN), not according to the Internet protocol.

SUMMARY OF THE INVENTION

Therefore, it is one object of the present invention to provide a controller for the electric loads in a motor vehicle which has a simple design, can be adapted flexibly to a wide variety of control functions and is easily scalable and expandable.

The above and other beneficial objects of the present invention are achieved by providing a controller in which each of the electric loads is arranged together with a local computer in a load module and is controlled by the respective local computer within the load module, and the local computers are connected to a central computer over a databus and exchange control data according to a standard protocol. An electric component (load) which is to be controlled or switched is connected to a local computer, e.g., in the form of a single-chip computer which contains or controls the control electronics. The component to be controlled (switched) can then be controlled easily by the central computer over the databus and by the local computers according to a standard protocol. The central computer has a client-server relationship with each of the local computers. Data exchange occurs between the central computer and the local computers via the databus in accordance with the Internet protocol, and the networked computers define an intranet.

It is possible to assign a separate local computer to each individual electric load. However, this means a relatively great expense for bus lines and local computers. Since there is a growing trend today toward combining multiple electric loads of related types or functions in prewired modules, according to a first embodiment of the present invention multiple electric loads are combined within a load module and controlled by a local computer. The databus may be designed to include a plurality of bus lines arranged in a star-shaped pattern between the central computer and the individual load modules, thus permitting easy assembly and easy expandability to add new modules or loads.

According to another preferred embodiment, the controller is especially simple and flexible if a server program, in particular a micro-server program, is installed in the local computers and a browser program is installed in the central computer for the purpose of data exchange. Such micro-servers, which need only a few kB of memory and thus can run on a small single-chip computer, have been available for some time and are marketed by the American company Spyglass, for example.

Thus, it is possible to retrofit a motor vehicle with power windows, for example, without causing the central computer to be underdimensioned as a result.

In addition, the CPU and the memory equipment of the central computer may be designed substantially independent of the electric equipment of the motor vehicle, which is advantageous in reducing inventories of spare parts at the automotive manufactures.

BRIEF DESCRIPTION OF THE DRAWINGS

FIG. 3 is a flow chart of a control process in the control system that defines an intranet according to the present invention.

DETAILED DESCRIPTION

Figure 1:
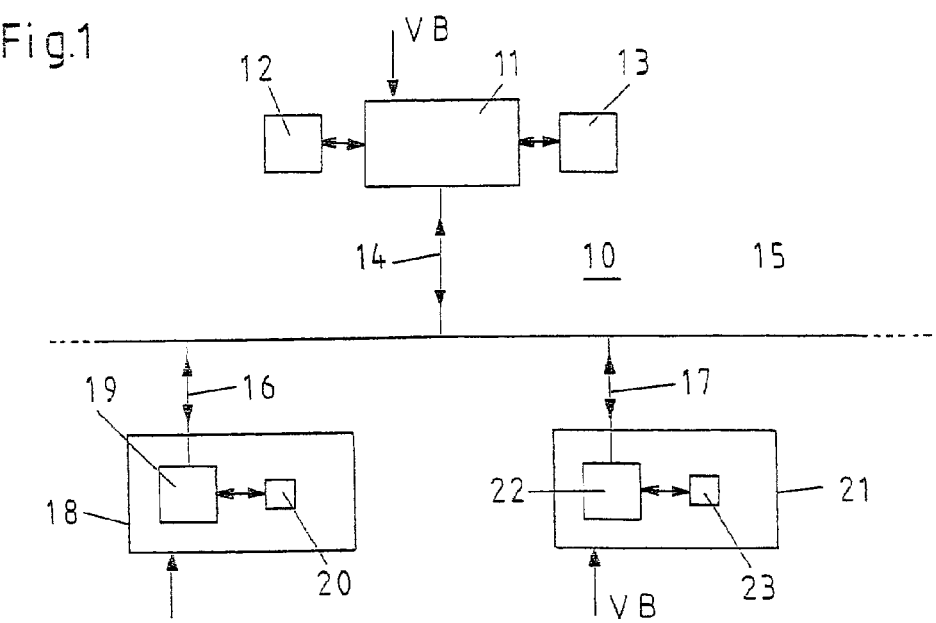
FIG. 1 is a schematic diagram of a first embodiment of a controller according to the present invention.

FIG. 1 shows a first embodiment of an automotive controller according to the present invention. In controller 10, a central computer 11 located in or near the dashboard, for example, exchanges control data via a common data bus 15 with individual local computers 19 and 22, each being assigned to loads 20 or 23 within a load module 18 or 21. Load module 18 may be, for example, a power window module, and load module 21 may be a seat adjuster. Computers 11, 19 and 22 are each connected to databus 15 by connecting lines 14, 16 and 17. Both central computer 11 and load modules 18, 21 are supplied separately with battery power VB. An Internet browser is run as an application program on central computer 11. A micro-server is run as the application program on local computers 19, 22. Each of the three units 11, 18, 21 has its own Internet address, e.g., "auto-pc.my-auto.car" or "powerwindowl.my-auto.car" and "seatl.my-auto.car."

FIG. 3 shows a schematic diagram of the control sequence, where:
A=start browser
B=server query
C=server searches for previous home page
D=browser shows previous status
E=input of new status
F=browser sends setpoint status
G=server gives command to controller
H=server sends new home page
I=browser shows new status To control the power windows, by analogy with the self-explanatory diagram in FIG. 3, the web client is started on the central computer ("auto PC") and the homepage of the power window (web server on local computer 19) is called up, for example. This presents the status and permits changes to be made. This can be done, for example, by using an input device (e.g., keyboard, etc.) 12 connected to central computer 11. Example: status displayed: "window open." Action: closing the window partially with a "soft" linear regulator or completely with a "soft" pushbutton (the soft elements are operating elements produced and displayed by the software). Final status displayed: "window (partially) closed".

In the case of the electrically adjustable seat load module 21), comfort features such as a personal adjustment profile are also possible and may be provided. These features may be controlled, called up and programmed over central computer 11. However, it is also possible to store the data for this in load module (seat module) 21 itself as well as in central computer 11.

If a display device 13 (e.g., a large-area LCD display) is connected to central computer 11, as shown in FIG. 1, the home pages of the individual loads or load modules may in fact be represented graphically. However, this is not essential for the functioning of the controller according to the present invention. Instead, the type of communication using a common (Internet) protocol and the allocation of the computer intelligence to central computer 11 as the client and local computers 19, 22 as servers is important.

Figure 2:
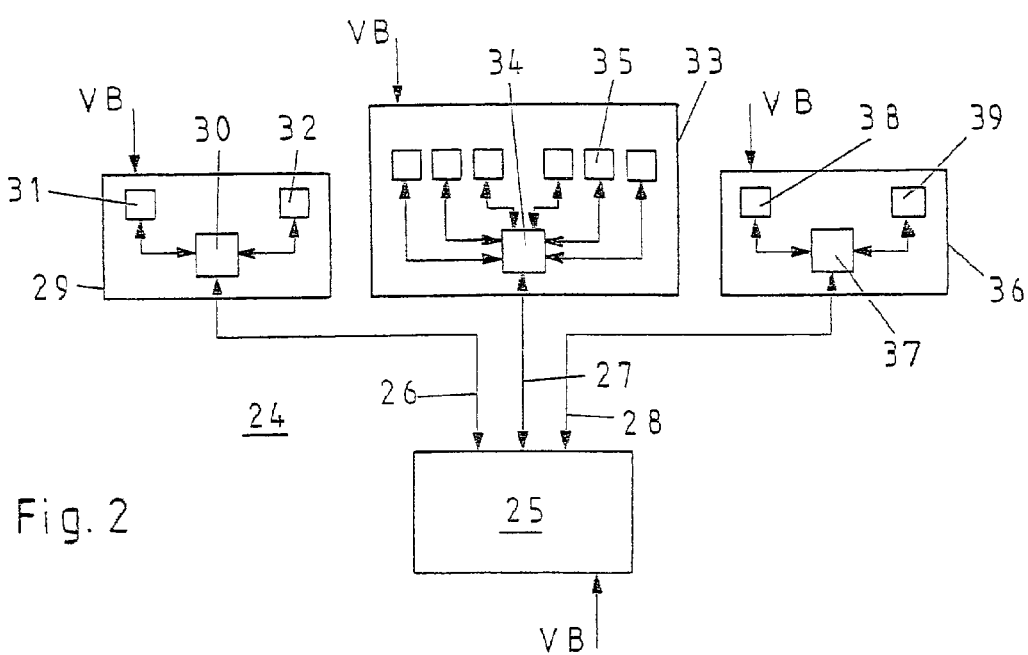
FIG. 2 is a schematic diagram of a second embodiment of the controller according to the present invention.

Essentially, the electric loads may all be designed individually as intelligent modules with a server function. However, it has become increasingly a standard practice in the automotive industry to assemble a vehicle from individual modules that have been completely assembled and prewired in advance by subcontractors, e.g., the front section with the headlight/turn signal combinations. In this regard, as illustrated in FIG. 2, individual electric loads 31, 32 and/or 35 and/or 38, 39 which belong together functionally, are combined into prewired load modules 29 and/or 33 and/or 36 and controlled within the load module by a single local computer 30 or 34 or 37 as the local intelligence. Intelligent load modules 29, 33, 36 are connected over star-shaped bus lines 26, 27, 28 to a central computer 25 which controls as a client the local computers/servers 30, 34, 37 according to the Internet protocol. Load modules 29 and 36 may be seat modules, for example, each with two motors as electric loads 31, 32 or 39, 39. Load module 33 may be, for example, a front module with six electric loads 35, each composed of two lamps, two turn indicators and two headlight height adjustments (three loads each on the right and left).

Electric components loads 31, 32 and/or 35 and/or 38, 39 are prewired in load modules 29, 33, 36. A local computer 30 or 34 or 37 is included and wired as the module intelligence in each module. No plugs are needed. To the outside, each module has two connections, namely an electric connection to the power supply and a bus line 26 or 27 or 28. The electric connection is connected to the battery power VB by any suitable method. The bus line (bus connection) is a cable, optionally long and with an optional plug. Central computer 25 is arranged on the dashboard. On the rear side it has a number of bushings (not shown) into which bus cables 26, 27, 28 from load modules 29, 33, 36 are inserted.

To adjust a seat, a command is sent from the central computer (e.g., in the manner described above, see FIG. 3) over operating elements on the dashboard to seat module 29 where the local computer then controls the corresponding motor (load 31 or 32). Likewise, to adjust a headlight from central computer 25 over operating elements on the dashboard, a command is sent to headlight module 33, where local computer 34 controls the corresponding motor. To turn on a headlight, a command is sent from central computer 25 over operating elements on the dashboard to headlight module (front module) 33 where local computer 34 turns on the corresponding headlight.

Since central computer 25 is not under any special load due to the switching operations, it is expedient to use for this a computer that is already present in the dashboard for other purposes (e.g., infotainment).

The present invention provides an automotive controller which has a simple design, is expandable and flexible to use and can be implemented with standardized hardware and software components.

What is claimed is:

1. A controller for a plurality of electric loads of a motor vehicle, comprising:
   a central computer;
   a databus; and
   a plurality of local computers, each local computer corresponding to and configured to control a respective one of the electric loads, each local computer being connected to the central computer via the databus and being configured to exchange control data according to an Internet protocol via the databus;
   wherein each electric load is arranged with the respective local computer in one of a plurality of load modules and is controlled by the respective local computer within the load module;

wherein the central computer is in a client-server relationship with each of the local computers; and wherein the central computer and the local computers define an intranet;

wherein each local computer includes a server program for the data exchange and wherein the central computer includes a browser program.

2. The controller according to claim 1, wherein one of the plurality of load modules includes a set of the electric loads, the set of the electric loads being controlled by one of the local computers.

3. The controller according to claim 2, wherein the databus includes a plurality of bus lines arranged in a star network between the central computer and the load modules.

4. The controller according to claim 1, wherein the server program includes a micro-server program.

5. The controller according to claim 1, further comprising a display device connected to the central computer, the display device being configured to display a home page of a respective one of the local computers selected for control.

* * * * *